(12) United States Patent
Nagano et al.

(10) Patent No.: US 9,927,117 B2
(45) Date of Patent: Mar. 27, 2018

(54) FOSSIL-FUEL POWER PLANT AND FOSSIL-FUEL POWER PLANT OPERATION METHOD

(71) Applicant: Electric Power Development Co., Ltd., Tokyo (JP)

(72) Inventors: Shiro Nagano, Tokyo (JP); Shinsuke Suzuki, Tokyo (JP)

(73) Assignee: Electric Power Development Co., Ltd., Tokyo (JP)

( * ) Notice: Subject to any disclaimer, the term of this patent is extended or adjusted under 35 U.S.C. 154(b) by 35 days.

(21) Appl. No.: 14/892,190

(22) PCT Filed: Mar. 31, 2014

(86) PCT No.: PCT/JP2014/059524
§ 371 (c)(1),
(2) Date: Nov. 18, 2015

(87) PCT Pub. No.: WO2014/188790
PCT Pub. Date: Nov. 27, 2014

(65) Prior Publication Data
US 2016/0091197 A1 Mar. 31, 2016

(30) Foreign Application Priority Data

May 23, 2013 (JP) .................................. 2013-109118

(51) Int. Cl.
*F22D 1/38* (2006.01)
*F23J 15/02* (2006.01)
(Continued)

(52) U.S. Cl.
CPC .................. *F22D 1/38* (2013.01); *F01K 7/22* (2013.01); *F01K 7/40* (2013.01); *F22D 1/02* (2013.01);
(Continued)

(58) Field of Classification Search
CPC ...... F22D 1/02; F22D 1/32; F22D 1/38; F23J 15/00; F23L 15/02
See application file for complete search history.

(56) References Cited

U.S. PATENT DOCUMENTS 3,485,048 A * 12/1969 Miliaras .................... F22D 1/02
122/477
3,818,872 A * 6/1974 Clayton, Jr. .............. F22D 1/02
122/406.4

(Continued)

FOREIGN PATENT DOCUMENTS

CN 102537933 A 7/2012
CN 102937295 A 2/2013
(Continued)

OTHER PUBLICATIONS

Thermal and Nuclear Power Engineering Society: Turbine, generator, and heat exchanger (p. 36, Fig. 6); Partial translation attached.
(Continued)

*Primary Examiner* — Nathaniel Herzfeld
(74) *Attorney, Agent, or Firm* — Knobbe, Martens, Olson & Bear, LLP

(57) ABSTRACT

A thermal power plant has an exhaust gas system, a feed-water system, a high-pressure feed-water heater provided to the feed-water system, a main economizer, a catalytic NOx removal equipment, and a sub economizer. The main economizer is provided to the secondary side of the high-pressure feed-water heater of the feed-water system and increases the temperature of the feed-water by using the residual heat of the combustion gas from the boiler. The catalytic NOx removal equipment is provided to the secondary side of the main economizer of the exhaust gas system. The exhaust gas is supplied to the catalytic NOx removal equipment at a required temperature or higher. The sub economizer is provided between the high-pressure feed-water heater and (Continued)

the main economizer and increases the temperature of water by using the exhaust gas on the secondary side of the NOx removal equipment.

12 Claims, 4 Drawing Sheets

(51) Int. Cl.
| | |
|---|---|
| F23J 15/06 | (2006.01) |
| F23L 11/00 | (2006.01) |
| F23L 15/02 | (2006.01) |
| F01K 7/22 | (2006.01) |
| F01K 7/40 | (2006.01) |
| F22D 1/02 | (2006.01) |
| F22D 1/32 | (2006.01) |
| F23J 15/00 | (2006.01) |
| F22D 1/34 | (2006.01) |

(52) U.S. Cl.
CPC ............... *F22D 1/32* (2013.01); *F22D 1/34* (2013.01); *F23J 15/00* (2013.01); *F23J 15/02* (2013.01); *F23J 15/06* (2013.01); *F23L 11/00* (2013.01); *F23L 15/02* (2013.01); *F23J 2215/10* (2013.01); *F23J 2219/10* (2013.01); *Y02E 20/348* (2013.01)

(56) References Cited

U.S. PATENT DOCUMENTS

| | | | | |
|---|---|---|---|---|
| 4,160,009 | A | | 7/1979 | Hamabe |
| 4,442,795 | A | * | 4/1984 | Strohmeyer, Jr. ... F22B 31/0007 110/245 |
| 5,423,272 | A | * | 6/1995 | Dunn, Jr. ............. F22B 37/008 110/264 |
| 5,554,350 | A | * | 9/1996 | Gurvich ............ B01D 53/8637 423/239.1 |
| 2001/0008066 | A1 | | 7/2001 | Liebig |
| 2002/0144505 | A1 | * | 10/2002 | Sonoda ................ F01K 23/106 60/618 |
| 2002/0194849 | A1 | * | 12/2002 | Saviharju ............... F01K 3/247 60/670 |
| 2007/0142975 | A1 | * | 6/2007 | Piche ....................... H02J 3/38 700/286 |
| 2011/0094228 | A1 | | 4/2011 | Fan et al. |
| 2012/0048215 | A1 | * | 3/2012 | Hicks ...................... D21F 5/20 122/1 C |
| 2012/0160142 | A1 | * | 6/2012 | Greenhut .......... B01D 53/8631 110/345 |

FOREIGN PATENT DOCUMENTS

| | | |
|---|---|---|
| CN | 102937297 A | 2/2013 |
| EP | 0753701 A1 | 1/1997 |
| JP | 53-015639 A | 2/1978 |
| JP | 07-012306 A | 1/1995 |
| JP | 09-026105 A | 1/1997 |
| JP | 2001-082109 A | 3/2001 |
| JP | 2002-206702 A | 7/2002 |
| JP | 2010-048456 A | 3/2010 |
| JP | 2011-247553 A | 12/2011 |
| KR | 20130028537 A | 3/2013 |
| WO | 2008-078721 A1 | 7/2008 |

OTHER PUBLICATIONS

International Search Report for PCT/JP2014/059524 dated Jun. 17, 2014; Translation attached.
Office Action dated Aug. 16, 2016 in Chinese Application No. 201480029065.7 with English Translation.
Notice of Allowance dated Sep. 16, 2014 in Japanese Patent Application No. JP-2013-109118; Translation attached.
Supplementary European Search Report, dated Feb. 3, 2017, in Application No. 14801816.1.

* cited by examiner

FOSSIL-FUEL POWER PLANT AND FOSSIL-FUEL POWER PLANT OPERATION METHOD

CROSS REFERENCE TO RELATED APPLICATIONS

This application is the U.S. National Phase Application under 35 U.S.C. § 371 of International Application No. PCT/JP2014/059524, filed Mar. 31, 2014, designating the U.S. and published as WO 2014/188790 A1 on Nov. 27, 2014 which claims the benefit of Japanese Patent Application No. JP-2013-109118, filed May 23, 2013. Any and all applications for which a foreign or a domestic priority is claimed is/are identified in the Application Data Sheet filed herewith and is/are hereby incorporated by reference in their entirety under 37 C.F.R. §1.57.

TECHNICAL FIELD

The present invention relates to a thermal power plant and a method of operating the thermal power plant.

Priority is claimed on Japanese Patent Application No. 2013-109118, filed May 23, 2013, the content of which is incorporated herein by reference.

BACKGROUND ART

FIG. 3 is the system diagram showing an example of a configuration of a general thermal power plant described in Non Patent Literature 1 detailed below.

As shown in FIG. 3, a general thermal power plant is generally constructed from the boiler 2; the steam system 3; the condensate system 44; and the feed-water system 4. The boiler 2 generates the combustion gas and combustion heat by combusting fuel such as coal, oil, or the like; and generates steam by increasing a temperature of feed-water by using the combustion heat. The steam system 3 has multiple steam turbines 5 and the condenser 6. Each of the steam turbines 5 is driven by the steam generated by the boiler 2. The steam exhausted from the steam turbines 5 enters into the condenser 6 to be steam condensate. The steam condensate in the condenser 6 is returned back to the boiler 2 through the condensate system 44 and feed-water system 4. The condensate system 44 has the condensate pump 7 for supplying the steam condensate, the low-pressure feed-water heater 8 constituted from multiple heat exchangers, and the deaerator 9. The feed-water system 4 has the high-pressure feed-water heater 10 constituted from the boiler feed-water pump 45 and multiple heat exchangers.

FIG. 4 is an enlarged view of the region P shown in FIG. 3 and indicates an enlarged view of the configuration around the boiler in a conventional coal-fired power plant as an example of a general thermal power plant. As shown in FIG. 4, the conventional coal-fired power plant 101 has: the boiler 102; the steam system 103; the feed-water system 104; the exhaust gas system 111; the primary air system 112; and the secondary air system 113.

The exhaust gas system 111 has the catalytic NOx removal equipment 114; the regenerative air preheater 115; the dust collector 116; the induced draft fan 117; the sulfur removal equipment 118; and the chimney 119. This exhaust gas system 111 is the flue channeling the combustion gas exhausted from the boiler 102 as the exhaust gas to the chimney 119. The exhaust gas exhausted from the boiler 102 is sent to the regenerative air preheater 115 after passage through the NOx removal equipment 114. After exchanging heat with the air for transporting pulverized coal in the primary air system 112 (hereinafter referred as "the primary air") and the air for combustion in the secondary air system 113 (hereinafter referred as "the secondary air"), the exhausted gas sent to the air preheater 115 passes through the dust collector 116; the induced draft fan 117; and the sulfur removal equipment 118, and is discharged into the atmosphere eventually.

The primary air system 112 has the primary air fan 120; the hot air damper 121; the bypass duct 122 to bypass the air preheater 115; the cold air damper 123 provided to the bypass duct 122; and the coal pulverizer 124. The primary air is produced by mixing the hot air, which is heated by heat exchanging with the exhaust gas from the boiler 102 in the air preheater 115, and the cold air, which provided from the bypass duct 122 bypassing the air preheater 115, by controlling each of openings of the hot air damper 121 and the cold air damper 123. Because of this, the air amount of the primary air is adjusted to the required amount for transporting the pulverized coal. In addition, temperature of the primary air at the inlet of the coal pulverizer 124 is adjusted to the required temperature. After above-described adjustments, the primary air is introduced into the coal pulverizer 124. The primary air introduced into the coal pulverizer 124 evaporates the moisture in the pulverized coal by using its potential heat; and transfers the dried pulverized coal to the pulverized coal burner provided to the boiler 102 to have the pulverized coal to be combusted. Although it is not depicted in the drawing, the fuel coal is supplied to the coal pulverizer 124 and pulverized to a predetermined grain size.

The secondary air system 113 has the forced draft fan 125. The secondary air is introduced into the air preheater 115 and heated by heat exchanging with the exhaust gas from the boiler 102. Then, the secondary air is introduced into the boiler 102 as the air for combustion by the pulverized coal burner and the air for the two staged combustion.

The feed-water system 104 has the deaerator 109; the boiler feed-water pump 145; the high-pressure feed-water heater 110; and the economizer 136. Between the intermediate-pressure steam turbine 105I and the deaerator 109, and between the intermediate-pressure steam turbine 105I and the high-pressure feed-water heater 110, the extraction system 129, and the extraction system 130 are provided, respectively. The extraction steam from the intermediate-pressure steam turbine 105I flows in both of the extraction systems 129, 130. In addition, between the high-pressure steam turbine 105H and the high-pressure feed-water heater 110, the steam extraction systems 131, 132 are provided. The extraction steam from the high-pressure steam turbine 105H flows in both of the extraction systems 131, 132. The drain pipes 133-135 are piping in which drain from the high-pressure feed-water heater flows.

The high-pressure feed-water heater 110 is consisted from multiple heat exchangers. They are referred as the first high-pressure feed-water heater 126; the second high-pressure feed-water heater 127; and the third high-pressure feed-water heater 128 based on their locations from the deaerator 109 for the sake of simplicity. Feed-water heated in the high-pressure feed-water heater 110 is sent to the economizer 136 in the boiler 102.

Each of heat exchangers of the high-pressure feed-water heater 110 heats feed-water by using the steam extracted from the intermediate-pressure steam turbine 105I and the high-pressure steam turbine 105H. The extraction system 130 sends the extraction steam to the first high-pressure feed-water heater 126; the extraction system 131 sends the extraction steam to the second high-pressure feed-water heater 127; and the extraction system 132 sends the extraction steam to the third high-pressure feed-water heater 128. The extraction steam sent to the second and third high-pressure feed-water heaters 127, 128 becomes drain after heat exchanging with feed-water. This drain is sent to the first high-pressure feed-water heater 126 through the drain pipes 135, 134. In the first high-pressure feed-water heater 126, feed-water is heated by using the drain from the second high-pressure feed-water heater 127 and the extraction steam extracted from the extraction system 130. Then, the drain discharged from the first high-pressure feed-water heater 126 is sent to the deaerator 109 through the drain pipe 133.

The steam system 103 has the evaporator 137; the superheater 138; the high-pressure steam turbine 105H; the reheater 139; and the intermediate-pressure steam turbine 105I. Feed-water introduced from the feed-water system 104 to the economizer 136 in the boiler 102 becomes superheated steam by passage through the evaporator 137 and the superheater 138. Then, the superheated feed-water is introduced into the high-pressure steam turbine 105H. The exhaust steam from the high-pressure steam turbine 105H is re-introduced into the boiler 102 and channeled to intermediate-pressure steam turbine 105I after re-heating by the reheater 139.

Making a thermal power plant with a regenerative reheating cycle highly efficient has been promoted conventionally (refer Patent Literature 1). Obtaining a steam condition with high temperature and high pressure is a very important and fundamental factor contributing to improvement of its efficiency. In general, increasing the steam temperature at the inlet of the steam turbine is very effective measure to improve power generation efficiency. Under the present set of circumstances, it is believed that the upper limitation of the high temperature in the steam condition for the materials standardized for the materials of thermal power plant for electric power generation is around 630° C. To deal with temperature higher than the steam temperature, usage of Fi-Ni-based alloy steel, Ni-based alloy steel, or the like is needed.

However, the usage of these materials is still in a developing stage as the next generation of high temperature materials at this time, since there are plenty of problems to be solved, such as their manufacturability and material properties, in the usage of these materials. In addition, these materials are more expensive than the currently standardized materials. Thus, usage of these materials becomes an economical problem during actual plant construction. Therefore, a highly efficient thermal power plant not relying on these high temperature materials has been desired.

Furthermore, in the case where the selective catalytic reduction NOx removal equipment is used as shown in FIG. 4, there is a problem in which the acidic ammonium sulfate is precipitated and the performance of the denitrification catalyst is reduced when the exhaust gas temperature at the inlet 114a of the NOx removal equipment 114 is low. In order to prevent this problem, it has to be operated in such a way that the exhaust gas temperature at the inlet 114a of the NOx removal equipment 114 is a high temperature free of the acidic ammonium sulfate precipitation. In other words, increasing a temperature of feed-water by increasing the heat-transfer area of the economizer 136 in order to reduce the temperature of the exhaust gas from the boiler, causes reduction of the denitrification performance in the early stage due to the reduction of the inlet gas temperature of the NOx removal equipment 114. Because of this, there is a problem that recovery of the exhaust gas temperature by the economizer 136 cannot be done sufficiently.

Furthermore, while the exhaust gas after passage through the NOx removal equipment 114 is subjected to heat exchanging with the primary air and the secondary air in the regenerative air preheater 115, there is a limitation for the temperature effectiveness of the air preheater 115. Therefore, the exhaust gas is released into the atmosphere from the chimney in the state where the potential heat of the exhaust gas from the boiler is not sufficiently recovered in the actual situation.

In addition, as shown in FIG. 4, the temperature of the primary air is controlled to be the required temperature in the inlet of the coal pulverizer 124 by controlling the mixing amounts of the hot air and the cold air in the conventional coal-fired power plant 101. However, the cold air does not contribute to the heat exchanging with the exhaust gas in the air preheater 115. Thus, there is a problem that heat exchanging between the combustion air (the primary air and the secondary air) and the exhaust gas from the boiler is not performed in the maximum efficient.

RELATED ART DOCUMENTS

Patent Literature

Patent Literature 1: Japanese Unexamined Patent Application, First Publication No. 2001-082109

Non Patent Literature

Non Patent Literature 1: Thermal and Nuclear Power Engineering Society: Turbine, generator, and heat exchanger (p. 36, FIG. 6)

SUMMARY

Problems to be Solved by the Invention

The present invention is made under the circumstance described above. The purpose of the present invention is to provide a thermal power plant, which is capable of improving power generation efficiency (including the gross thermal efficiency and the net thermal efficiency) by efficiently using exhaust heat of the exhaust gas from the boiler while satisfying the optimal environmental standards, and a method of operating the thermal plant.

Means for Solving the Problem

In order to solve the problems, aspects of the present invention have the configurations described below.

An aspect of the present invention is a thermal power plant including: a boiler configured to generate steam by increasing a temperature of feed-water by using heat obtained by combusting a fuel; an exhaust gas system configured to circulate an combustion gas, which is exhausted from the boiler after combusting the fuel, as an exhaust gas; a feed-water system configured to supply water to the boiler; a feed-water heater that is provided to the feed-water system and is configured to increase the temperature of feed-water by using extraction steam; a main economizer, which is provided to a secondary side of feed-water from feed-water heater of the feed-water system and is configured to increase the temperature of feed-water by using residual heat of the combustion gas; and a catalytic NOx removal equipment, which is provided to a secondary side of the exhaust gas from the main economizer of the exhaust gas system and the exhaust gas at a required temperature or higher is configured to be supplied to, wherein a sub economizer, which is configured to increase the temperature of feed-water by using the exhaust gas on a secondary side of the NOx removal equipment, is provided between the feed-water heater and the main economizer of the feed-water system.

In the thermal power plant, which is an aspect of the present invention, a temperature of the exhaust gas on a primary side of the NOx removal equipment may be a temperate free of acidic ammonium sulfate precipitation, or higher.

In the thermal power plant, which is an aspect of the present invention, the sub economizer may include an exhaust gas temperature control device that is configured to control a temperature of the exhaust gas on a secondary side of the sub economizer.

In the thermal power plant, which is an aspect of the present invention, the exhaust gas temperature control device may include: a gas duct provided from a primary side to a secondary side of the exhaust gas from the sub economizer of the exhaust gas system; and a gas amount control damper provided to the gas duct.

In the thermal power plant, which is an aspect of the present invention, the exhaust gas temperature control device may include: a feed-water pipe provided from a primary side to a secondary side of feed-water from the sub economizer of the feed-water system; and a feed-water amount control valve provided to the feed-water pipe.

The thermal power plant, which is an aspect of the present invention, may further include: an air system configured to supply air to the boiler; and an air preheater that is provided to a secondary side of the exhaust gas from the sub economizer of the exhaust gas system and is configured to increase a temperature of air of the air system by using the exhaust gas on the secondary side of the sub economizer, wherein a temperature of the exhaust gas on the secondary side of the air preheater may be in a required temperature range.

In the thermal power plant, which is an aspect of the present invention, the air system may include: a primary air system; and a secondary air system, and a temperature increasing device that is configured to increase a temperature of air on a primary side of the air preheater is provided to the primary air system.

In the thermal power plant, which is an aspect of the present invention, the temperature increasing device may be a steam air preheater configured to heat air by using steam.

In the thermal power plant, which is an aspect of the present invention, a coal pulverizer may be provided to the primary air system on the secondary side of the air preheater.

Other aspect of the present invention is a method of operating a thermal power plant including; an exhaust gas system configured to circulate an combustion gas, which is exhausted from a boiler, as an exhaust gas; a feed-water system configured to supply water to the boiler; an air system configured to supply air to the boiler; a catalytic NOx removal equipment, which is provided to the exhaust gas system and the exhaust gas at a required temperature or higher is configured to be supplied to; a main economizer provided to a primary side of the NOx removal equipment; a sub economizer, which is provided to a primary side of feed-water from the main economizer and configured to increase the temperature of feed-water by using the exhaust gas on a secondary side of the NOx removal equipment; and an air preheater, which is provided to a secondary side of the exhaust gas from the sub economizer and is configured to increase a temperature of air of the air system by using the exhaust gas on the secondary side of the sub economizer, the method including the step of controlling a temperature of the exhaust gas on a secondary side of the air preheater of the exhaust gas system in such a way that the temperature is in a required temperature range.

In the method of operating a thermal power plant, which is other aspect of the present invention, part of or all of the exhaust gas in the exhaust gas system may be transferred to the air preheater free of passage through the sub economizer.

In the method of operating a thermal power plant, which is other aspect of the present invention, part of or all of feed-water in the feed-water system may be transferred to the main economizer free of passage through the sub economizer.

Effects of the Invention

The thermal power plant, which is an aspect of the present invention, includes the sub economizer between the high-pressure feed-water heater and the main economizer, in addition to the conventional economizer (main economizer). Thus, heat can be recovered from the exhaust gas after passage through the NOx removal equipment to the boiler feed-water. Therefore, power generation efficiency can be improved.

DETAILED DESCRIPTION

Figure 1:
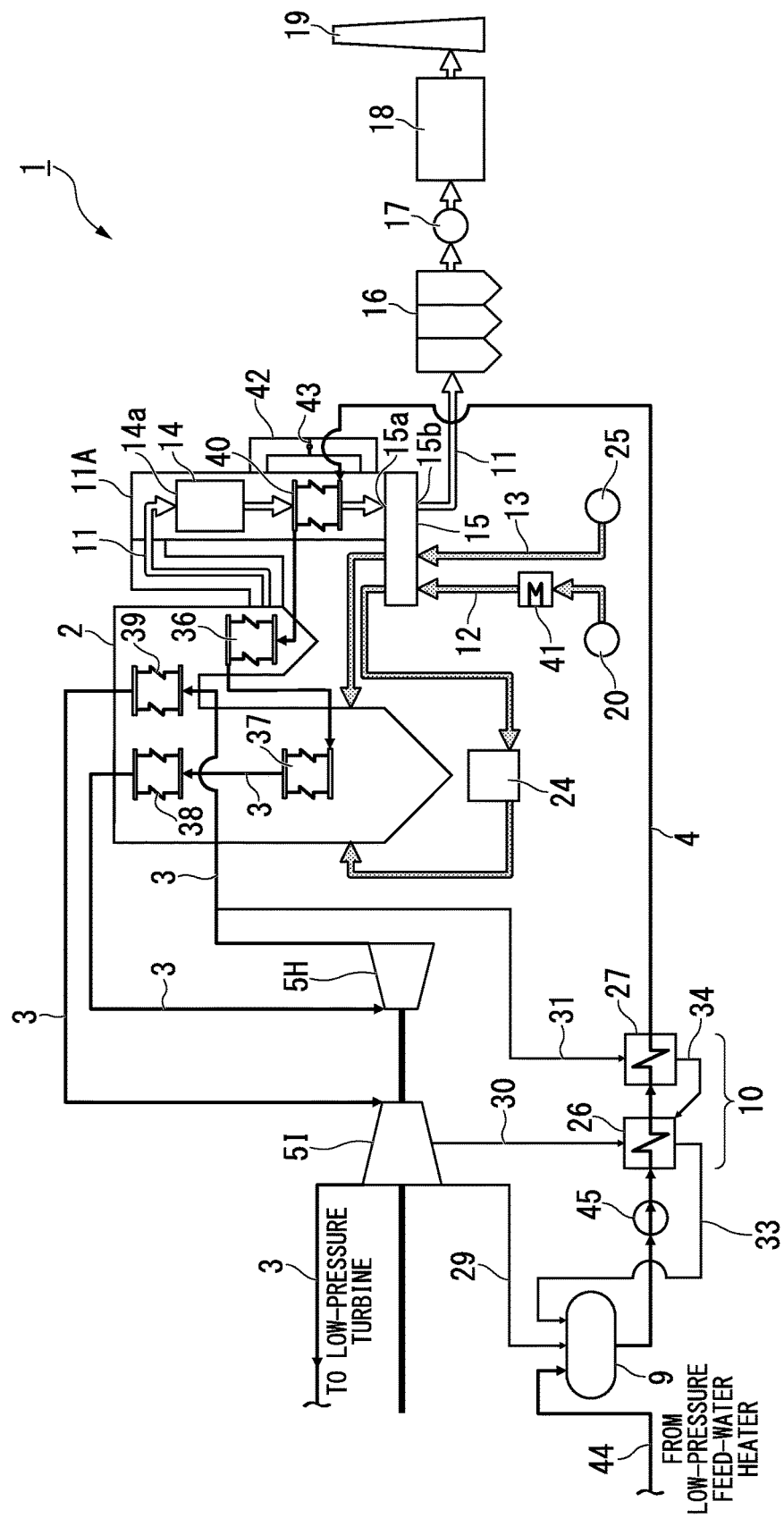
FIG. 1 is an enlarged view of the configuration around the boiler of the coal-fired power plant of the first embodiment of the present invention.

The coal-fired power plant, which is an embodiment of a thermal power plant that is an aspect of the present invention, is explained in detail in reference to drawings below. In the drawings used in the explanation below, there is a case in which a specific part shown is enlarged for convenience. Thus, dimension ratios or the like of each of the constituents are not necessarily the same as the actual parts. In addition, the configurations, materials, dimensions, or the like are indicated as an example in the following explanation; and they are not necessarily limiting the present invention. Thus, appropriate modifications can be made within a range not departing from the technical scope of the present invention.

[First Embodiment]

FIG. 1 is the system diagram showing an enlarged view around the boiler of the coal-fired power plant 1 (hereinafter referred as "plant"), which is the first embodiment of a thermal power plant that is an aspect of the present invention. In FIG. 1, descriptions of the electrical system, various wires, or the like are omitted for clarity of the arrangement of constituents contributing the regenerative reheating cycle.

First, the configuration of the plant 1 of the present embodiment is explained. As shown in FIG. 1, the plant 1 is generally constructed from the boiler 2; the exhaust gas system 11; the steam system 3; the feed-water system 4; the high-pressure feed-water heater 10; the main economizer 36; the NOx removal equipment 14; and the sub economizer 40. The boiler 2 increases the temperature of feed-water by using heat obtained by combusting the fuel to generate steam. The exhaust gas system 11 circulates the combustion gas exhausted from the boiler 2 as the exhaust gas. The steam system 3 drives the high-pressure steam turbine 5H, the intermediate-pressure steam turbine 5I, and the low-pressure steam turbine (omitted in the drawing) by using the steam generated by the boiler 2. After driving these steam turbines, the steam system 3 supplies the steam to the condenser (refer the reference symbol 6 in FIG. 3). The feed-water system 4 supplies condensate water obtained by the condenser to the boiler 2. The high-pressure feed-water heater 10 is provided to the feed-water system 4, and increases the temperature of feed-water by using the steam extracted from the steam turbines 5H, 5I. The main economizer 36 is provided to the secondary side of the high-pressure feed-water heater 10 of the feed-water system 4 and in the boiler 2. The main economizer 36 increases the temperature of feed-water by using the combustion gas in the boiler 2. The NOx removal equipment 14 is provided to the secondary side of the exhaust gas from the main economizer 36 of the exhaust system 11. The exhaust gas at the required temperature or higher is supplied to the NOx removal equipment 14. The sub economizer 40 is provided between the high-pressure feed-water heater 10 of the feed-water system 4 and the main economizer 36, and increases the temperature of feed-water by using the exhaust gas on the secondary side of the NOx removal equipment 14.

The exhaust gas system 11 has the flue 11A as shown in FIG. 1. The exhaust gas system 11 has the catalytic NOx removal equipment 14 and the sub economizer 40 in the flue 11A, and has the regenerative air preheater 15 at the outlet of the flue 11A.

In addition, the flue 11A has the gas duct 42, which is provided though the primary side (inlet side, upstream side) and the secondary side (outlet side, downstream side) of the exhaust gas from the sub economizer 40, and the gas amount control damper 43 provided to the gas duct 42. By the gas duct 42, part of or all of the exhaust gas flowing in the flue 11A can be sent to the air preheater 15 free of passage through the sub economizer 40 (in other words, the sub economizer 40 can be bypassed). In addition, by the gas amount control damper 43, the flow rate of the exhaust gas bypassing in the gas duct 42 can be controlled. In the plant 1 of the present embodiment, the gas duct 42 and the gas amount control damper 42 constitute the exhaust gas temperature control device.

In addition, the exhaust gas system 11 has: the dust collection device 16; the induced draft fan 17; the sulfur removal equipment 18; and the chimney 19 on the secondary side (subsequent stage) of the air preheater 15. The exhaust gas 11 is the flue channeling the combustion gas exhausted from the boiler 2 to the chimney 19 as the exhaust gas.

The exhaust gas exhausted from the boiler 2 is sent to the sub economizer 40 after passage through the NOx removal equipment 14. The exhaust gas sent to the sub economizer 40 is sent to the regenerative air preheater 15 after heat exchanging with the feed-water on the secondary side of the high-pressure feed-water heater 10 of the feed-water system 4. The exhaust gas sent to the air preheater 15 passes through the dust collection device 16 and the sulfur removal equipment 18 after heat exchanging with the air for transporting pulverized coal in the primary air system 12 (hereinafter referred as "the primary air") and the air for combustion in the secondary air system 13 (hereinafter referred as "the secondary air"). Then, the exhaust gas is discharged into the atmosphere.

The primary air system 12 has the primary air fan 20; the steam air preheater 41; and the coal pulverizer 24. All of the primary air is sent to the air preheater 15. This primary air sent to the air preheater 15 is heated by heat exchanging with the exhaust gas from the boiler 2. Because of this, the primary air is introduced to the coal pulverizer 24 after being adjusted to the required temperature at the inlet of the coal pulverizer 24.

The primary air introduced in the coal pulverizer 24 vaporizes the moisture in the pulverized coal by its potential heat, and transfers the dried pulverized coal to the pulverized coal burner provided to the boiler 2 to have the pulverized coal to be combusted. Although it is not depicted in the drawing, the fuel coal is supplied to the coal pulverizer 24 and pulverized to a predetermined grain size. In a case where the temperature of the primary air sent to the coal pulverizer 24 is low after passage through the air preheater 15, the primary air is heated in advance by the steam air preheater 41 provided to the air duct between the primary air fan 20 and the air preheater 15.

The secondary air system 13 has the forced draft fan 25. All of the secondary air is introduced in the air preheater 15. This secondary air sent to the air preheater 15 and heated by heat exchanging with the exhaust gas from the boiler 2. Then, the secondary air is introduced into the boiler 2 as the air for combustion by the pulverized coal burner and the air for the two staged combustion.

The feed-water system 4 has: the deaerator 9; the boiler feed-water pump 45; the high-pressure feed-water heater 10; the sub economizer 40; and the main economizer 36. Between the intermediate-pressure steam turbine 5I and the deaerator 9; and between the intermediate-pressure steam turbine 5I and the high-pressure feed-water heater 10, the steam extraction systems 29, 30, in which extraction steam from the intermediate-pressure steam turbine 5I flows, are provided, respectively. In addition, between the high-pressure steam turbine 5H and the high-pressure feed-water heater 10, the steam extraction system 31 is provided in which the extraction steam from the high-pressure steam turbine 5H flows. The drain pipes 33, 34 are piping in which drain from the high-pressure feed-water heater 10 flows.

The high-pressure feed-water heater 10 is constituted from multiple heat exchangers. They are referred as the first high-pressure feed-water heater 26; and the second high-pressure feed-water heater 27 based on their locations from the deaerator 9 for the sake of simplicity. Feed-water heated by the high-pressure feed-water heater 10 is sent to the sub economizer 40 in the flue 11A.

Each of heat exchangers of the high-pressure feed-water heater 10 heats feed-water by using the steam extracted from the intermediate-pressure steam turbine 5I and the high-pressure steam turbine 5H. The extraction system 30 sends the extraction steam to the first high-pressure feed-water heater 26; and the extraction system 31 sends the extraction steam to the second high-pressure feed-water heater 27. The extraction steam sent to the second high-pressure feed-water heater 2 becomes drain after heat exchanging with feed-water. This drain is sent to the first high-pressure feed-water heater 26 through the drain pipe 34. In the first high-pressure feed-water heater 26, feed-water is heated by using the drain from the second high-pressure feed-water heater 27 and the extraction steam extracted from the extraction system 30.

Then, the drain discharged from the first high-pressure feed-water heater 26 is sent to the deaerator 9 through the drain pipe 33.

The steam system 3 has the evaporator 37; the superheater 38; the high-pressure steam turbine 5H; the reheater 39; and the intermediate-pressure steam turbine 5I. Feed-water introduced from the feed-water system 4 to the main economizer 36 in the boiler 2 becomes superheated steam by passage through the evaporator 37 and the superheater 38. Then, the superheated feed-water is introduced into the high-pressure steam turbine 5H. The exhaust gas from the high-pressure steam turbine 5H is re-introduced into the boiler 2 and channeled to intermediate-pressure steam turbine 5I after re-heating by the reheater 39.

The plant 1 of the present embodiment uses the selective catalytic reduction NOx removal equipment 14. There is a problem in which the acidic ammonium sulfate is precipitated and the performance of the denitrification catalyst is reduced when the exhaust gas temperature at the inlet 14a of the NOx removal equipment 14 is low. In order to prevent this problem, in the conventional coal-fired power plant, it is operated in such a way that the exhaust gas temperature at the inlet 114a of the NOx removal equipment 114 is a high temperature free of the acidic ammonium sulfate precipitation (generally, it is about 300° C. or higher). Therefore, the reduction of the performance of the denitrification catalyst due to precipitation of the acidic ammonium sulfate can be prevented in the present embodiment too by retaining the exhaust gas temperature (temperature of the exhaust gas on the primary side) at the inlet 14a of the NOx removal equipment 14 equivalent to that of the conventional coal-fired power plant 101.

In the conventional coal-fired power plant 101, there was a problem that recovery of the exhaust gas temperature by the economizer 136 cannot be done sufficiently when the exhaust gas temperature at the inlet 115a is kept at a high temperature at which the acidic ammonium sulfate does not precipitate in order to suppress the reduction of the denitrification performance in the early stage due to the reduction of the inlet gas temperature of the NOx removal equipment 14. In addition, while the exhaust gas after passage through the NOx removal equipment 114 is subjected to heat exchanging with the primary air and the secondary air in the regenerative air preheater 115, there is a limitation for the temperature effectiveness of the air preheater 115. Therefore, the exhaust gas is released into the atmosphere from the chimney in the state where the potential heat of the exhaust gas from the boiler is not sufficiently recovered in the actual situation. Furthermore, in the case where the heat recovery is attempted in the downstream of the air preheater 115, the heat-transfer area of the heat exchanger increases to cause a problem in which the device is oversized.

Contrary to this, according to the plant 1 of the present embodiment, it is configured to provide the sub economizer 40 to the flue 11A between the NOx removal equipment 14 and the air preheater 15 in addition to the main economizer 36 provided to the upstream (on the primary side) of the NOx removal equipment 14 as shown in FIG. 1. By providing the sub economizer 40, the gas temperature on the outlet 15b side (on the secondary side) of the air preheater 15 can be reduced compared to the conventional coal-fired power plant 101 since the heat can be recovered to the boiler feed-water from the exhaust gas after passage through the NOx removal equipment 14. Therefore, by recovering the heat corresponding to the decrement of the gas temperatures on the outlet 15b side of the air preheater 15 to the boiler feed-water, the power generation efficiency of the plant 1 of the present embodiment is improved.

Figure 4:
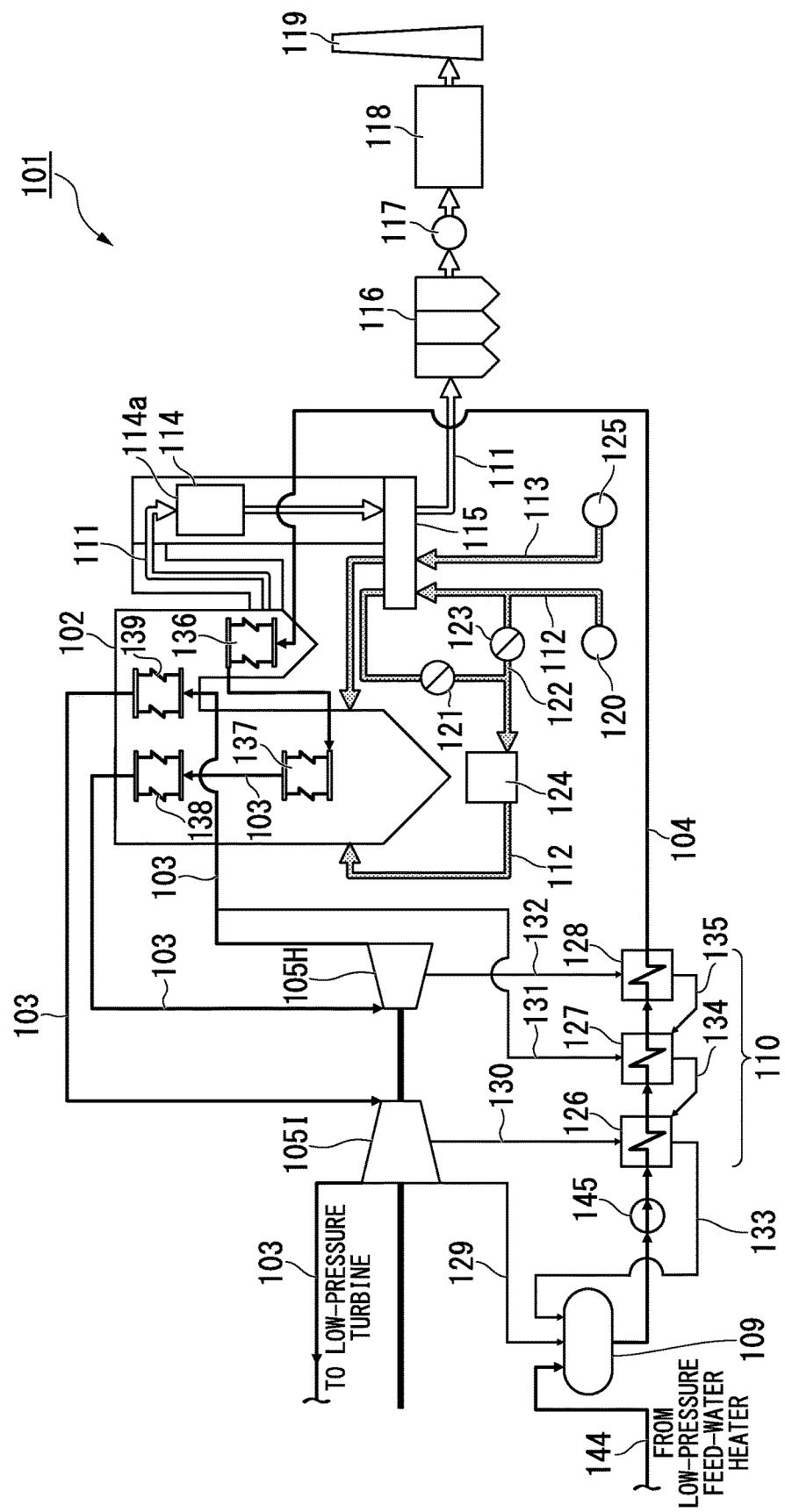
FIG. 4 is an enlarged view of the region P shown in FIG. 3 and an enlarged view of the configuration around the boiler in a conventional coal-fired power plant.

In the conventional coal-fired power plant 101, the high-pressure feed-water heater 110 is consisted from three-staged heat exchanger in order to improve the turbine plant (water-steam) efficiency as shown in FIG. 4. In addition, the feed-water is sent to the economizer 136 in the boiler 102 after the temperature of the feed-water is increased to about 280° C.-290° C., for example, by the intermediate stage extraction steam of the high-pressure steam turbine 105H at the third high-pressure feed-water heater 128, which is the last stage of the high-pressure feed-water heater 110.

Contrary to this, the third high-pressure feed-water heater 128, which is the last heat exchanger in the conventional high-pressure feed-water heater 110, and the extraction steam system 132 are not provided; and the high-pressure feed-water heater 10 is constituted from the first and second high-pressure feed-water heaters 26, 27 in the plant 1 of the present embodiment as shown in FIG. 1. Because of this, the feed-water, which is heated, for example to about 250° C., by using the extraction steam from the steam system 3 from the high-pressure steam turbine 5H to the reheater 39 in the second high-pressure feed-water heater 27, is sent to the sub economizer 40. As explained above, the cold end temperature on the exhaust gas side can be reduced by setting a lower temperature of the feed-water temperature on the secondary side of the high-pressure feed-water heater 10 than the temperature on the secondary side of the last-stage of the high-pressure feed-water heater 110 of the conventional coal-fired power plant 101. At the same time, the heat-transfer area of the sub economizer 40 can be reduced since a larger logarithmic mean temperature difference between the exhaust gas and the boiler feed-water can be obtained.

The turbine plant efficiency is reduced with the reduction of the feed-water temperature on the outlet side (secondary side) of the second high-pressure feed-water heater 27, which is the last stage of the high-pressure feed-water heater 10. On the other hand, with the increase of the feed-water temperature, a suitable sub economizer 40 might not be practically unobtainable due to a concern on the device dimension, since the heat recovery efficiency from the exhaust gas in the sub economizer 40 is reduced and the needed heat-transfer area is increased. For example, the turbine plant efficiency reduces 0.5-0.6% (relative value) in the case where the feed-water temperature is about 250° C. compared to the case where the feed-water temperature on the outlet side (secondary side) of the final feed-water heater is 280-290° C. In addition, the heat-transfer area becomes equivalent of the heat-transfer area of the main economizer of the conventional coal-fired power plant 101 or less in the case where the feed-water temperature is about 250° C. Therefore, it is needed for the feed-water temperature to be determined in consideration with the balance, at which the heat recovery from the exhaust gas in the sub economizer 40 can be performed efficiently while the reduction of the turbine plant efficiency is suppressed at the minimum level.

According to the plant 1 of the present embodiment, it has the air preheater 15 in the exhaust gas system 11 as shown in FIG. 1. In the case where the exhaust gas temperature on the outlet 15b side of the air preheater 15 becomes low, low-temperature corrosion of the air preheater 15 due to sulfur content or the like in the exhaust gas components might be promoted. Therefore, it is preferable that the exhaust gas temperature on the outlet 15b side (secondary side) of the air preheater 15 is kept within the required temperature range. Promotion of the low-temperature corrosion on devices due to sulfur content or the like in the exhaust gas components can be prevented by keeping the exhaust gas on the outlet 15b side of the air preheater 15 within the predetermined temperature range.

In terms of the required temperature range, the temperature of the air preheater 15 at the cold end (secondary side of the exhaust gas) preventing the low-temperature corrosion is the lower limit. Specifically, for example, in the case where the air preheater 15 shown in FIG. 1, is a Ljungstrom type air preheater, in order to prevent low-temperature corrosion on the cold end element, the plant 1 is controlled in such a way that the cold end average temperature becomes the recommended value shown in the technical literature (refer the drawing shown in page 167 in "Companion-Thermal and Nuclear Power Generation-Companion (7th Edition)" published from Thermal and Nuclear Power Engineering Society) or higher. The meaning of the cold end average temperature is explained in the above-mentioned technical literature. It means the arithmetic average of the temperature on the secondary side of the exhaust gas of the air preheater and the temperature on the primary side of the air. The recommended value of the cold end average temperature varies depending on the amount of sulfur content in fuel. Therefore, the lower limit of the temperature on the secondary side of the exhaust gas of the air preheater is calculated from the recommended value of the cold end average temperature corresponding to the sulfur content in fuel using the drawing shown in the above-mentioned technical literature and the temperature on the primary side of the air of the air preheater.

For example, assuming that the using fuel is the coal whose sulfur content in the fuel is 1.0%, the recommended value of the cold end average temperature is 66° C. or higher based on the drawing shown in the above-mentioned technical literature. Here, in the case where the temperature on the primary side of the air of the air preheater is 40° C., the lower limit of the temperature on the secondary side of the exhaust gas of the air preheater becomes 92° C. as shown in the formula indicated below.

(Temperature on the secondary side of the exhaust gas) =

2×(Recommended value of the cold end average value) −

(Temperature on the primary side of the air) =

2×66° C.−40° C. = 92° C.

Next, the method of controlling the exhaust gas temperature on the secondary side of the air preheater 15 of the exhaust gas system 11 within the required temperature range in the above-described plant 1 of the present embodiment is explained.

In the plant 1 of the present embodiment, in the case where the exhaust gas temperature on the outlet 15b side (secondary side) of the air preheater 15 becomes low due to the influence of a partial load operation; change of coal types; fluctuation in the atmospheric temperature; or the like, first, part or all of the exhaust gas bypasses the sub economizer 40 by introducing the exhaust gas into the gas duct 42 bypassing the sub economizer 40. Because of this, the amount of heat exchange in the sub economizer 40 can be reduced; and the exhaust gas temperature at the inlet 15a and the outlet 15b of the air preheater 15 can be increased.

Next, in the case where the temperature of the primary air after passage through the air preheater 15 is not high enough to dry coal in the coal pulverizer 24 in the primary air system 12, the primary air temperature after passage through the air preheater 15 is increased by heating the primary air on the primary side (inlet side) of the air preheater 15 by the steam air preheater 41 provided to the air duct between the primary air fan 20 and the air preheater 15.

In addition, in the case where the exhaust gas temperature on the outlet 15b side of the air preheater 15 becomes low due to the influence of a partial load operation; change of coal types; fluctuation in the atmospheric temperature; or the like; and in the case where the temperature of the primary air after heat exchanging at the air preheater 15 is not reached to a high temperature (is not heated sufficiently) even with heating by the steam air preheater 41, both of the gas duct 42, which bypasses the above-explained sub economizer 40, and the gas amount control damper 43 are used. Because of this, the exhaust gas temperature on the inlet 15a side of the air preheater 15 can be increased; and the temperature of the primary air on the outlet side of the air preheater 15 can be increased in the primary sir system 12.

According to the method of operating the plant 1 of the present embodiment, higher efficiency can be obtained by efficiently utilizing the exhaust heat of the exhaust gas from the boiler while satisfying the optimum environmental standard since the plant 1 is controlled in such a way that the exhaust gas on the secondary side of the air preheater 15 of the exhaust gas system 11 becomes a temperature within the required temperature range.

As explained above, according to the plant 1 of the present embodiment, by providing the sub economizer 40 to the flue 11A between the NOx removal equipment 14 and the air preheater 15, the high-temperature exhaust gas on the secondary side of the NOx removal equipment 14 can exchange heat efficiently with the boiler feed-water while the reduction of the denitrification catalyst performance is suppressed by keeping the exhaust gas temperature on the inlet 14a side of the NOx removal equipment 14 to the temperature free of the acidic ammonium sulfate precipitation.

In addition, the plant 1 of the present embodiment is free of the third high-pressure feed-water heater 128 (the high-pressure feed-water heater 110), which heats feed-water to about 285° C. by using the extraction steam of the intermediate stage of the high-pressure steam turbine 105H in the conventional coal-fired power plant 101. Because of this, the cold end temperature on the exhaust gas side can be reduced since the feed-water temperature on the secondary side of the second high-pressure feed-water heater 27, which is the last stage, of the high-pressure feed-water heater 10 can be lowered to about 250° C. At the same time, a larger logarithmic mean temperature difference between the exhaust gas and the boiler feed-water can be obtained. Therefore, the heat-transfer area of the sub economizer 40 can be reduced to the level equivalent to the main economizer 36.

Further, according to the plant 1 of the present embodiment, the exhaust heat of the exhaust gas from the boiler can be recovered to the main feed-water system by proving the sub economizer 40. Thus, higher power generation efficiency can be obtained compared to the conventional coal-fired power plant 101.

Furthermore, the plant 1 of the present embodiment is free of the third high-pressure feed-water heater 128 (the high-pressure feed-water heater 110), which heats feed-water to about 285° C. by using the extraction steam of the intermediate stage of the high-pressure steam turbine 105H in the conventional coal-fired power plant 101. Because of this, the main steam flow rate corresponding to the amount of the extraction steam in the intermediate stage at the high-pressure steam turbine 5H can be reduced. Thus, the facility of: the main water pipe; the main economizer; the evaporator; the superheater; the main steam pipe; and the high-pressure steam turbine, can be down-sized. Therefore, the construction cost can be reduced. In addition, the construction for the unnecessary extraction steam system 132 and the third high-pressure feed-water heater 128 can be saved.

In addition, according to the plant 1 of the present embodiment, reduction of the power consumption for the induced draft fan 17 and down-sizing of the downstream devices can be obtained because the actual gas volume is shrunk due to reduction of the gas temperature on the outlet 15b side (secondary side) of the air preheater 15, compared to the conventional coal-fired power plant 101. Thus, the construction cost can be reduced.

Further, according to the plant 1 of the present embodiment, all of the primary air can be forced to pass the air preheater 15 since the plant 1 has the temperature increasing device that increases the temperature of the primary air (steam air preheater 41). Thus, heat exchanging from the boiler exhaust gas to the air for combustion can be performed efficiently.

[Second Embodiment]

Next, the second embodiment, which is an aspect of the present invention, is explained. The present embodiment has different configurations to the plant 1 and the method of operating the plant 1 of the first embodiment. Therefore, the thermal power plant and the method of operating the thermal power plant of the present embodiment are explained by using FIG. 2. In the explanation, the same reference symbols as the first embodiment are used for the identical constituents to the first embodiment, and detail explanations for them are omitted.

Figure 2:
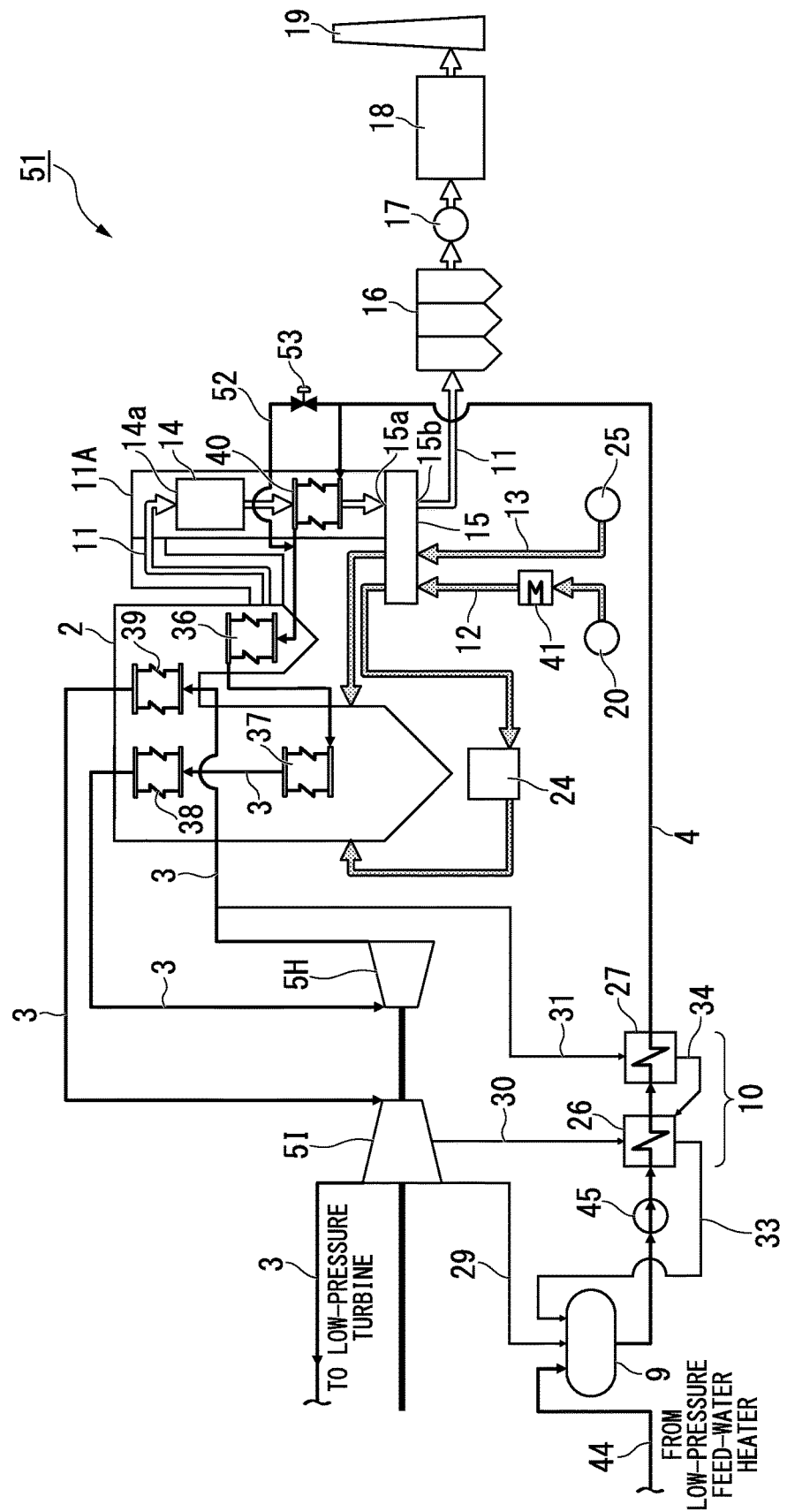
FIG. 2 is an enlarged view of the configuration around the boiler in the coal-fired power plant of the second embodiment of the present invention.

The coal-fired power plant 51 of the present embodiment has the configuration in which the feed-water pipe 52; and the feed-water amount control valve 53, both of which corresponds to the exhaust gas temperature control device, replace the gas duct 42; and the gas amount control damper 43 (refer FIG. 1), both of which constitute the exhaust gas temperature control device in the plant 1 of the first embodiment as shown in FIG. 2.

Specifically, the feed-water system 4 has: the feed-water pipe 52 provided from the primary side (inlet side, upstream side) to the secondary side (outlet side, downstream side) of the sub economizer 40; and the feed-water amount control valve 53 provided to the feed-water pipe 52, as shown in FIG. 2. By the feed-water pipe 52, part or all of feed-water flowing in the feed-water system 4 can be sent to the main economizer 36 free of passage through the sub economizer 40 (in other words, the feed-water bypasses the sub economizer 40). In addition, by the feed-water amount control valve 53, the flow rate of feed-water bypassing in the feed-water pipe 52 can be controlled. In the coal-fired power plant 51 of the present embodiment, the exhaust gas temperature control device is constituted from the feed-water pipe 52 and the feed-water amount control valve 53.

Next, the method of controlling the exhaust gas temperature on the secondary side of the air preheater 15 of the exhaust gas system 11 within the required temperature range in the above-described coal-fired power plant 51 of the present embodiment is explained.

In the coal-fired power plant 51 of the present embodiment, in the case where the exhaust gas temperature on the outlet 15b side (secondary side) of the air preheater 15 becomes low due to the influence of a partial load operation; change of coal types; fluctuation in the atmospheric temperature; or the like, first, part or all of the exhaust gas bypasses the sub economizer 40 by introducing feed-water into the feed-water pipe 52 bypassing the sub economizer 40 by using the feed-water amount control valve 53.

Because of this, the amount of heat exchange in the sub economizer 40 can be reduced; and the exhaust gas temperature at the inlet 15a and the outlet 15b of the air preheater 15 can be increased.

In addition, in the case where the exhaust gas temperature on the outlet 15b side of the air preheater 15 becomes low due to the influence of a partial load operation; change of coal types; fluctuation in the atmospheric temperature; or the like; and in the case where the temperature of the primary air after heat exchanging at the air preheater 15 is not reached to a high temperature (is not heated sufficiently) even with heating by the steam air preheater 41, both of the feed-water pipe 52, which bypasses the above-explained sub economizer 40, and the water amount control valve 53 are used. Because of this, the exhaust gas temperature on the inlet 15 a side of the air preheater 15 can be increased; and the temperature of the primary air on the outlet side of the air preheater 15 can be increased in the primary sir system 12.

As explained above, according to the coal-fired power plant 51 of the present embodiment, the same technical effect as the first embodiment can be obtained.

The scope of the present invention is not limited by descriptions of the above-described embodiments of the present invention, and various modifications can be made within the scope of the technical concept of the present invention. For example, although the heat exchangers of the high-pressure feed-water heater 10 is configured to be two-staged in the plant 1 of the embodiment as shown in FIG. 1, it is not limited to this configuration as long as the feed-water temperature on the secondary side of the last heat exchanger is configured to be the required temperature in the high-pressure feed-water heater 10.

Figure 3:
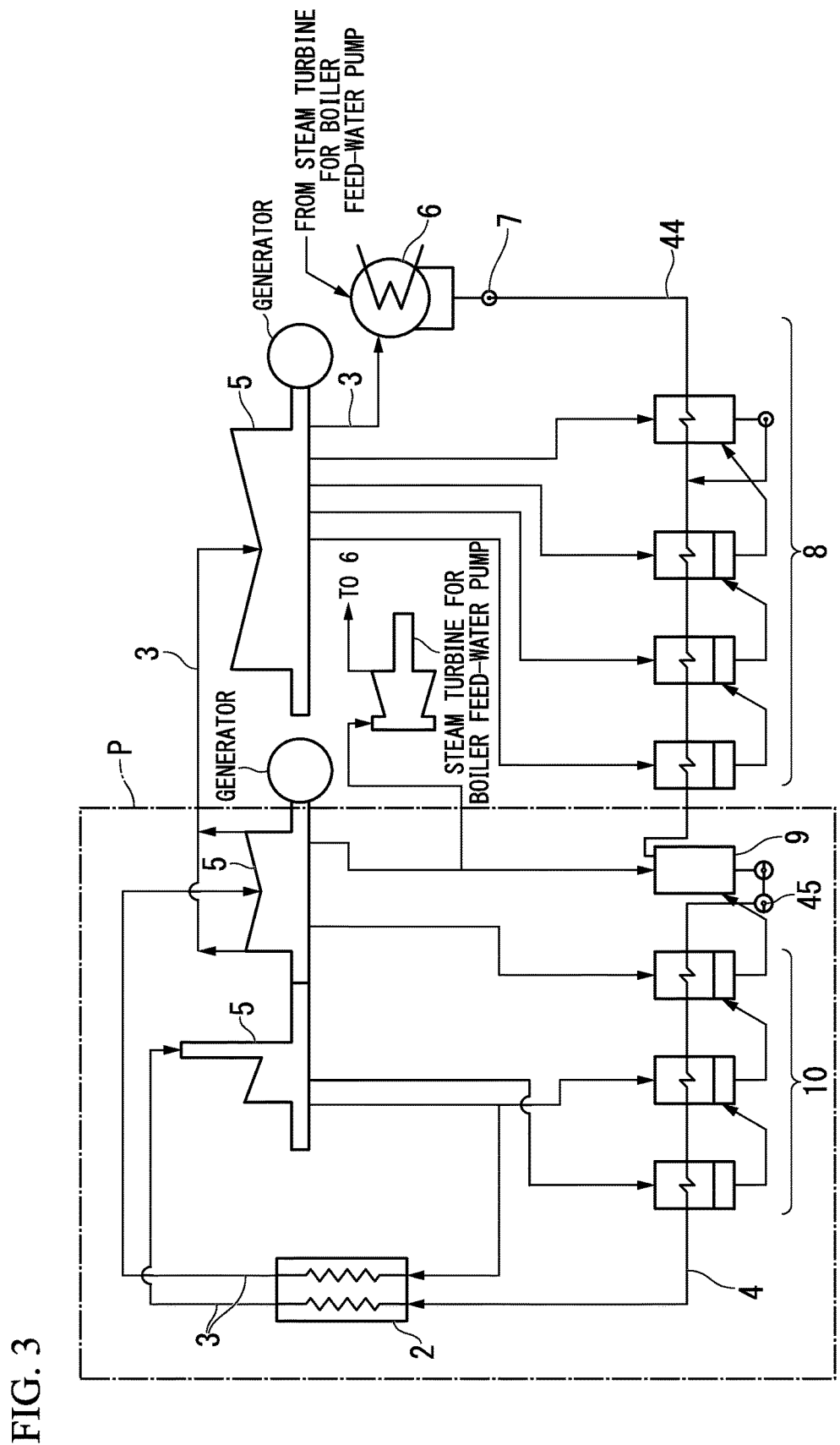
FIG. 3 is the system diagram showing an example of a configuration of a general thermal power plant.

In addition, the configuration related to the number of the stages of the low-pressure feed-water heater 8 can be appropriately selected as shown FIG. 3.

Temperatures indicted in the descriptions of the above-described embodiments are only for an example purpose and the present invention is not limited by the descriptions. Appropriately selected temperatures can be set when the configuration of the plant and the situation the in which plant is operated are changed.

EXAMPLES

Specific Examples are shown below.

Simulation of a coal-fired plant of 600,000 kW was performed and improving effect on the net thermal efficiency was confirmed.

Comparative Examples 1

First, as Comparative Example, the operating condition for the coal-fired power plant 101 shown in FIG. 4 is shown below.

In the conventional coal-fired power plant 101, the main steam flow rate supplied to the high-pressure steam turbine 105H was about 1,560 t/h during a rated power operation.

In addition, the amount of extraction steam from the extraction steam system 132, which was provided to the intermediate stage of the high-pressure steam turbine 105H, to the third high-pressure feed-water heater 128 was about 110 t/h.

The feed water temperature on the outlet side (secondary side) of the third high-pressure feed-water heater 128 of the feed-water system 104 was about 285° C. by the above-described extraction steam. The feed-water heated by the third high-pressure feed-water heater 128 was supplied to the economizer 136.

The exhaust gas temperature on the secondary side (outlet side) of the NOx removal equipment 114 of the exhaust gas system 111 was about 360° C.

On the other hand, the exhaust gas temperature on the secondary side (outlet side) of the air preheater 115 of the exhaust gas system 111 was about 140° C.

Further, the power needed for the induced draft fan 117 of the exhaust gas system 111 was about 7,200 kW.

Example 1

Next, the operation condition for the coal-fired power plant 1 shown in FIG. 1 is shown below as Example of an aspect of the present invention. The coal-fired power plant 1 was free of the third high-pressure feed-water heater 128 and the extraction steam system 132 of the conventional coal-fired power plant 101; and had the sub economizer 40 which was not present in the configuration of the conventional coal-fired power plant 101.

In the coal-fired power plant 1 of an aspect of the present invention, the main steam flow rate supplied to the high-pressure steam turbine 5H was about 1,450 t/h during a rated power operation. This was because of reduction of the steam flow of about 110 t/h, which corresponded to the amount of extraction steam to the high-pressure feed-water heater 128 from the extraction steam system 132 provided to the intermediate stage of the high-pressure steam turbine 105H in the conventional coal-fired power plant 101.

In addition, the feed-water temperature on the outlet side (secondary side) of the second high-pressure feed-water heater 27, which was the last stage of the high-pressure feed-water heater 10 of the feed-water system 3, was about 250° C., meaning that the temperature was reduced about 35° C. compared to the above-described Comparative Example 1. The feed-water heated by the second high-pressure feed-water heater 27 was supplied to the sub economizer 40.

The exhaust gas temperature on the primary side (inlet 14a side) of the NOx removal equipment 14 of the exhaust gas system 11 was about 360° C. as in the above-described Comparative Example 1.

On the other hand, the exhaust gas temperature on the secondary side (outlet side) of the air preheater 15 of the exhaust gas system 11 was about 110° C., meaning that the temperature was reduced about 30° C. compared to the above-described Comparative Example 1.

Further, the power needed for the induced draft fan 17 of the exhaust gas system 11 was about 6,700 kW, meaning that the power needed was reduced about 500 kW compared to the above-described Comparative Example 1. This is because of reduction of volume due to lowered temperature of the exhaust gas flowing in the exhaust gas system 11.

[Verification Result 1]

Results of the simulation of efficiency of Comparative Example 1 and Example 1 of the present invention are shown in Table 1 below.

TABLE 1

|  | Comparative Example 1 | Example 1 of the present invention | Improving effect (absolute value) |
|---|---|---|---|
| Boiler efficiency (%) | 89.0 | 90.4 | 1.4 |
| Turbine plant efficiency (%) | 49.0 | 48.7 | −0.3 |
| (Plant loss (%)) | (1.5) | (1.5) | — |
| Gross thermal efficiency (%) | 43.0 | 43.4 | 0.4 |
| Auxiliary power rate (%) | 5.5 | 5.4 | −0.1 |
| Net thermal efficiency (%) | 40.6 | 41.1 | 0.5 |

As shown in Table 1, it was confirmed that the boiler efficiency was improved about 1.4% from 89.0% (Comparative Example 1) to 90.4% (Example 1 of the present invention) in the coal-fired power plant 1 of Example 1 because of lowering the exhaust gas temperature on the secondary side (outlet side) of the air preheater 15 to 110° C. (in other words, by recovering the heat of the exhaust gas to the feed-water side by providing the sub economizer 40).

On the other hand, it was confirmed that the turbine plant efficiency (water-steam efficiency) was reduced from 49.0% (Comparative Example 1) to 48.7% (Example 1 of the present invention) in the coal-fired power plant 1 of Example 1 because of: being free of the third high-pressure feed-water heater 128 and the extraction steam system 132; and reduction of the feed-water temperature on the outlet side of the second high-pressure feed-water heater 27 as the last stage heat exchanger of the high-pressure feed-water heater 10 to about 250° C.

The gross thermal efficiency was calculated by the formula, (Boiler efficiency×Turbine plant efficiency×(100−Plant loss))/10000. Accordingly, it was confirmed that the gross thermal efficiency was improved about 0.4% from 43.0% (Comparative Example 1) to 43.4% (Example 1 of the present invention) as a whole.

In addition, in terms of the auxiliary power rate, the volume of the exhaust gas reduces by decreasing the temperature of the exhaust gas on the secondary side (outlet side) of the air preheater 15 to 110° C. Accordingly, it was confirmed that the auxiliary power ratio was improved about 0.1% from 5.5% (Comparative Example 1) to 5.4% (Example 1 of the present invention).

Because of these improvements, it was confirmed that the net thermal efficiency was improved about 0.5% from 40.6% (Comparative Example 1) to 41.1% (Example 1 of the present invention) in the absolute value; and the net thermal efficiency was improved about 1.1% in the relative value.

The net thermal efficiency was calculated from the formula, (Gross thermal efficiency×(100−Auxiliary power ratio))/100.

[Effect Comparison 2]

In addition to the improvement of the gross thermal efficiency and the net thermal efficiency compared to the coal-fired power plant 101 of Comparative Example 1, the cost reduction effect during plant construction can be obtained from the coal-fired power plant of Example 1 of the present invention.

First, in the case where a coal-fired power plant of 600,000 kW was simulated, the required main steam flow can be reduced from 1560 t/h (Comparative Example 1) to 1450 t/h (Example 1 of the present invention) during a rated power operation. Specifically, extraction steam from the high-pressure steam turbine 105H to the third high-pressure feed-water heater 128 was performed at 110 t/h, in the coal-fired power plant 101 of Comparative Example 1. The steam flow corresponding to the extraction steam can be reduced in Example 1 of the present invention.

Therefore, about 7% of the main steam flow was reduced compared to the conventional coal-fired power plant 101. Thus, the material costs for pipes between: the main water pipe; the sub economizer; the main economizer; the evaporator; the superheater; the main steam pipe; and the inlet of the high-pressure steam turbine, can be reduced Particularly, expensive alloy steel has been used in the steam system 3 between: the superheater 38 in the boiler 2 or the superheater 38; and the high-pressure steam turbine 5H. Because of the reduction of the main steam flow, the amount of usage of the expensive alloy steel can be reduced too. On the other hand, the sub economizer 40 is added in the coal-fired power plant 1 of Example 1. However, the additional cost for providing the sub economizer 40 is limited since the heat transferring part of the sub economizer 40 is not exposed to the high temperature. Therefore, according to the present invention, the usage amount of the material part that is particularly expensive can be reduced, and the cost for plant construction can be reduced.

In addition, according to the coal-fired power plant 1 of Example 1, the volume of the exhaust gas is reduced compared to the above-described Comparative Example 1 because of lowering the exhaust gas temperature on the secondary side (outlet side) of the air preheater 15 of the exhaust gas system 11 to about 110° C. Because of this, the power needed for the induced draft fan 17 can be reduced; and the devices provided to the exhaust system 11 can be down-sized. Therefore, the plant construction cost can be reduced.

As explained above, improving the steam condition with the current standardized materials is close to the limit in the conventional thermal power plant. In the power plant of the 600° C-class of the steam temperature, the improvement value of the power generation efficiency is within about 0.2% in a relative value even if the steam temperature was increased by 10° C. However, it comes with reduction of material strength due to the higher temperature. Thus, it necessitates counter measures such as thickening of the parts or the like, leading to increase of the plant construction cost in reality.

On the other hand, according to the coal-fired power plant of Example 1, it was confirmed that the power generation efficiency can be improved as a whole without increasing the steam temperature; and the plant construction cost can be reduced at the same time, by newly providing the sub economizer 40 on the secondary side of the NOx removal equipment 14 for recovering the heat from the exhaust gas to feed-water.

BRIEF DESCRIPTION OF THE REFERENCE SYMBOLS 1, 51: Coal thermal power plant (thermal power plant, plant)
2: Boiler
3: Steam system
4: Feed-water system
5: Steam turbine
5H: High-pressure steam turbine
5I: Intermediate-pressure steam turbine
6: Condenser
7: Condensate pump
8: Low-pressure feed water heater
9: Deaerator
10: High-pressure feed water heater
11: Exhaust gas system
11A: Flue
12: Primary air system (air system)
13: Secondary air system (air system)
14: NOx removal equipment
15: Air preheater
18: Sulfur removal equipment
24: Coal pulverizer
26: First high-pressure feed-water heater
27: Second high-pressure feed-water heater
36: Main economizer
40: Sub economizer
41: Steam air preheater (temperature increase part)
42: Gas duct (exhaust gas temperature control device)
43: Gas-amount control damper (exhaust gas temperature control device)
52: Feed-water pipe (exhaust gas temperature control device)
53: Water amount control valve (exhaust gas temperature control device)
128: Third high-pressure feed-water heater
132: Extraction steam system

What is claimed is:
1. A thermal power plant comprising:
a boiler configured to generate steam by increasing a temperature of feed-water by using heat obtained by combusting a fuel;
a steam system comprising a high-pressure steam turbine, a reheater, and an intermediate-pressure steam turbine;
an exhaust gas system configured to circulate a combustion gas, which is exhausted from the boiler after combusting the fuel, as an exhaust gas;
a feed-water system configured to supply the feed water to the boiler;
a feed-water heater that is provided to the feed-water system and is configured to increase the temperature of the feed-water by using extraction steam;
a main economizer, which is provided to a secondary side of the feed-water from the feed-water heater of the feed-water system and is configured to increase the temperature of the feed-water by using residual heat of the combustion gas; and
a catalytic NOx removal equipment, which is provided to a secondary side of the exhaust gas from the main economizer of the exhaust gas system, the catalytic NOx removal equipment being configured to be supplied with the exhaust gas at a required temperature or higher, wherein
a sub economizer, which is configured to increase the temperature of the feed-water by using the exhaust gas on a secondary side of the NOx removal equipment, is provided between the feed-water heater and the main economizer of the feed-water system,
the feed-water introduced from the feed-water system to the boiler becomes superheated steam,
the superheated steam is introduced into the high-pressure steam turbine and re-introduced in the boiler after being introduced into the high-pressure steam turbine,
the steam, which is exhausted from the high-pressure steam turbine and re-introduced in the boiler, is introduced in the intermediate-pressure steam turbine after being reheated in the reheater,
the feed-water heater consists of a first feed-water heater and a second feed-water heater in an order from upstream to downstream of the feed water;

a first extraction system, in which extracted steam from the intermediate-pressure steam turbine flows, is provided between the intermediate-pressure steam turbine and the first feed-water heater, and a second extraction system, in which extracted steam from the high-pressure steam turbine to the reheater flows, is provided between the high-pressure steam turbine and the second feed-water heater.

2. The thermal power plant according to claim 1, wherein a temperature of the exhaust gas on a primary side of the NOx removal equipment is a temperature free of acidic ammonium sulfate precipitation, or higher.

3. The thermal power plant according to claim 1, wherein the sub economizer comprises an exhaust gas temperature control device that is configured to control a temperature of the exhaust gas on a secondary side of the sub economizer.

4. The thermal power plant according to claim 3, wherein the exhaust gas temperature control device comprises: a gas duct provided from a primary side to a secondary side of the exhaust gas from the sub economizer of the exhaust gas system; and a gas amount control damper provided to the gas duct.

5. The thermal power plant according to claim 3, wherein the exhaust gas temperature control device comprises: a feed-water pipe provided from a primary side to a secondary side of the feed-water from the sub economizer of the feed-water system; and a feed-water amount control valve provided to the feed-water pipe.

6. The thermal power plant according to claim 1, further comprising:

an air system configured to supply air to the boiler; and an air preheater that is provided to a secondary side of the exhaust gas from the sub economizer of the exhaust gas system and is configured to increase a temperature of air of the air system by using the exhaust gas on the secondary side of the sub economizer, wherein a temperature of the exhaust gas on the secondary side of the air preheater is in a required temperature range.

7. The thermal power plant according to claim 6, wherein the air system comprises: a primary air system; and a secondary air system, and a temperature increasing device that is configured to increase the temperature of air on a primary side of the air preheater is provided to the primary air system.

8. The thermal power plant according to claim 7, wherein the temperature increasing device is a steam air preheater configured to heat the air by using steam.

9. The thermal power plant according to claim 7, wherein a coal pulverizer is provided to the primary air system on the secondary side of the air preheater.

10. A method of operating a thermal power plant comprising:

an exhaust gas system configured to circulate a combustion gas, which is exhausted from a boiler, as an exhaust gas;

a feed-water system configured to supply feed water to the boiler;

a feed-water heater that is provided to the feed-water system and is configured to increase the temperature of the feed-water by using extraction steam;

an air system configured to supply air to the boiler;

a main economizer, which is provided to a secondary side of the feed-water from the feed-water heater of the feed-water system and is configured to increase the temperature of the feed-water by using residual heat of the combustion gas;

a catalytic NOx removal equipment, which is provided to a secondary side of the exhaust gas from the main economizer of the exhaust gas system, the catalytic NOx removal equipment being configured to be supplied with the exhaust gas at a required temperature or higher;

a sub economizer, which is provided between the feed-water heater and the main economizer of the feed-water system and configured to increase a temperature of the feed-water by using the exhaust gas on a secondary side of the NOx removal equipment;

a steam system comprising a high-pressure steam turbine, a reheater, and an intermediate-pressure steam turbine; and an air preheater, which is provided to a secondary side of the exhaust gas from the sub economizer and is configured to increase a temperature of air of the air system by using the exhaust gas on the secondary side of the sub economizer, the method comprising the step of controlling a temperature of the exhaust gas on a secondary side of the air preheater of the exhaust gas system in such a way that the temperature is in a required temperature range, wherein the feed-water introduced from the feed-water system to the boiler becomes superheated steam, the superheated steam is introduced into the high-pressure steam turbine and re-introduced in the boiler after being introduced into the high-pressure steam turbine, the steam, which is exhausted from the high-pressure steam turbine and re-introduced in the boiler, is introduced in the intermediate-pressure steam turbine after being reheated in the reheater, the feed-water heater consists of a first feed-water heater and a second feed-water heater in an order from upstream to downstream of the feed-water, a first extraction system, in which extracted steam from the intermediate-pressure steam turbine flows, is provided between the intermediate-pressure steam turbine and the first feed-water heater, and a second extraction system, in which extracted steam from the high-pressure steam turbine to the reheater flows, is provided between the high-pressure steam turbine and the second feed-water heater.

11. The method of operating a thermal power plant according to claim 10, wherein part of or all of the exhaust gas in the exhaust gas system is sent to the air preheater free of passage through the sub economizer.

12. The method of operating a thermal power plant according to claim 10, wherein part of or all of the feed-water in the feed-water system is sent to the main economizer free of passage through the sub economizer.

* * * * *